Sept. 13, 1960  K. HÄUSSERMANN  2,952,453
PRESSING BODIES FOR RESILIENT MEMBERS
ESPECIALLY FRICTION CLUTCHES
Filed May 2, 1957
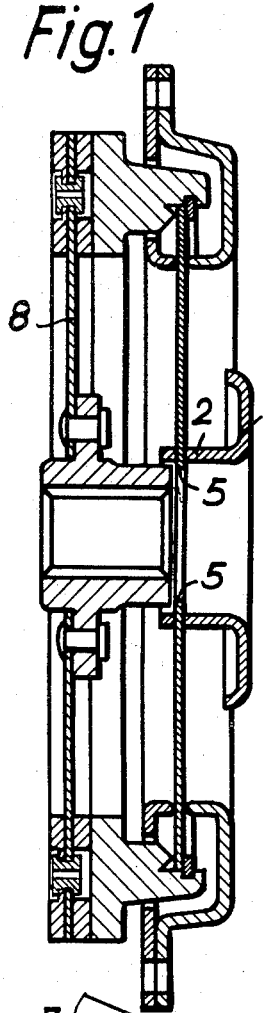
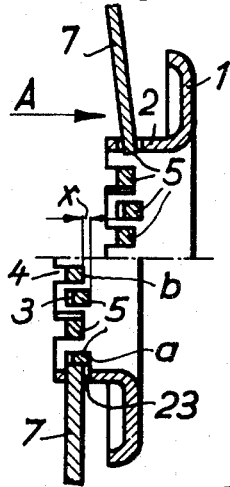
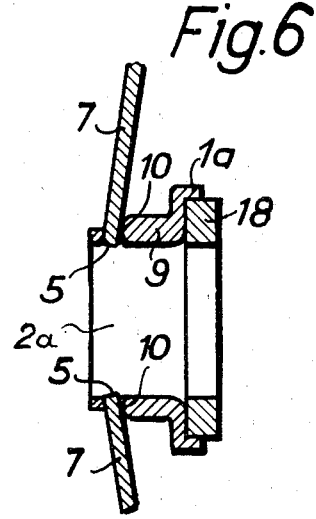
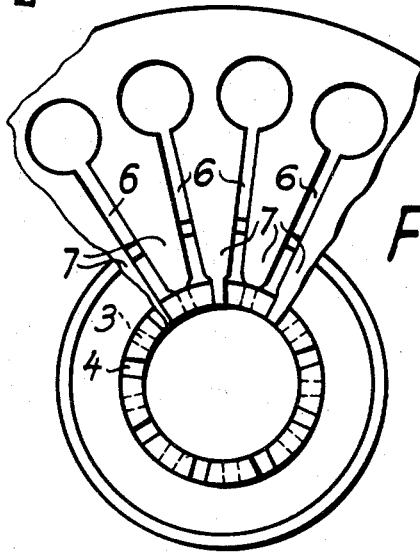
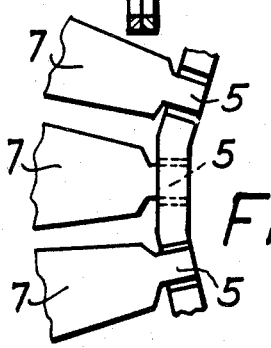
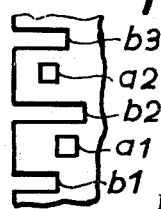
INVENTOR.
Kurt Häussermann
BY
Patent Agent

United States Patent Office 2,952,453
Patented Sept. 13, 1960

2,952,453

PRESSING BODIES FOR RESILIENT MEMBERS, ESPECIALLY FRICTION CLUTCHES

Kurt Häussermann, Stuttgart, Germany, assignor to Lamellen- und Kupplungsbau August Haussermann, Stuttgart-Oberturkheim, Germany Filed May 2, 1957, Ser. No. 656,682

Claims priority, application Germany May 9, 1956

13 Claims. (Cl. 267—1)

The present invention relates to pressing bodies for resilient elements, particularly for friction clutches with spring discs of the Belleville type for use in connection with motor vehicles and the like. Annular pressing bodies are known for this purpose which are so designed that they are adapted along a relatively small end surface to engage a disc spring at one side thereof. These pressing bodies are either cast or forged, are correspondingly machined, which means usually are turned or milled and polished, and are relatively heavy and expensive.

It is, therefore, an object of the present invention to provide a pressing body for resilient elements of the above mentioned type which will be considerably simpler and cheaper in manufacture than similar pressing bodies heretofore used.

It is also an object of this invention to provide a pressing body of the type set forth in the preceding paragraph, which is additionally characterized by a very low weight.

It is a further object of this invention to provide a pressing body for use in connection with resilient members such as disc springs of friction clutches, which for all practical purposes will be noiseless in operation.

These and other objects and advantages of the invention will appear more clearly from the following specification in connection with the accompanying drawings in which:

Fig. 1 represents an axial section through a disc spring clutch with a pressing body according to the invention.

Fig. 2 illustrates on a somewhat larger scale than that of Fig. 1 the connection between the pressing body according to the invention and a disc spring, said connection being shown in untensioned condition in the upper portion of Fig. 2 and in tensioned condition in the lower portion of Fig. 2.

Fig. 3 is a partial view of Fig. 2 seen in the direction of the arrow A; the upper portion of Fig. 3 showing a portion of the disc spring, while the disc spring has been omitted in the lower portion of Fig. 3.

Fig. 4 is a portion of a polygonal extension of the pressing body according to the invention.

Fig. 5 represents a development of a part of the extension of Fig. 4 with stepwise offset contacting surfaces which may alternately be distributed in the lower circle.

Fig. 6 is a section through a modification of the pressing body according to the invention.

The pressing body according to the invention differs from the pressing bodies for resilient elements of the heretofore known type primarily in that it is neither cast nor forged but is drawn from thin metal and pressed, extruded or sintered or produced according to the cold flow pressing method, or is made of a special type of rubber. The pressing body according to the invention consists of an annular disc having a hollow cylindrical or hollow prismatic extension for receiving one or a plurality of elastic elements as for instance the inner ends of the tongues of a disc spring which extend radially or along an incline into the said extension so as to be connected therewith in a force locking manner. The pressing body may be bowl-shaped and may be drawn from sheet metal, preferably steel sheet metal, and may be case hardened. Due to the rolling process, the metal obtains a completely smooth surface and generally does not require any additional machining. The pressing bodies produced therefrom and having a bowl shape are considerably lighter in weight than the heretofore customary forged or cast pressing bodies and in view of the fact that they have been hardened are highly wear resistant. The resilient tongues are received by cut-outs provided in the said extensions of the pressing body. These cut-outs or openings are open toward the periphery of the extension. If desired, closed and open cut-outs may alternate in regular succession. Expediently, the inner contacting edges or surfaces of said cut-outs against which the resilient elements rest are offset individually or in groups in axial direction in order to maintain a permanent preload. The offset arrangement is such that when the pressing member is actuated, the elastic elements are individually or in groups caused successively at short intervals to become effective whereby a progressive increase in pressure and thus a particularly soft actuation of the clutch will be obtained.

Referring now to the drawing in detail, the pressing body shown in Figs. 1 to 4 thereof represents a pressing body drawn from sheet metal and provided with an annular pressure plate 1 and a hollow cylindrical extension 2. That end portion of the extension 2 which is remote from the pressure plate 1 is provided with closed cut-outs 3 which alternate with cut-outs 4 which are open toward the outer peripheral portion of said extension. The ends 5 of the individual resilient tongues 7 which are separated from each other by slits 6 and pertain to a disc spring of the Belleville type extend into the said cut-outs, said disc spring serving in a well known manner for actuating and releasing the clutch disc 8. In order to assure that the pressing body will not rattle in the disc spring, the window-like cut-outs 23 with their contacting surfaces $a$ (shown on the right hand side at the lower half of Fig. 2) are offset in axial direction by the distance $x$ with regard to the open contacting surfaces $b$. In this way, the cylindrical or polygonal extension 2 is continuously held under preload. The pressing body will thus throughout its entire stroke and operation operate in a noiseless manner.

Fig. 4 illustrates on a somewhat larger scale a portion of the extension of a pressing body with polygonal cross section. This arrangement has the advantage over the cylindrical cross section of said extension that the ends 5 of the resilient tongues contact the edges defining the cut-outs not only along two lines as is the case with the circular shape but along the entire lateral surfaces of the cut-outs.

Fig. 5 by way of a development illustrates an embodiment according to which the contacting surfaces $a_1$, $a_2$, $a_3$, $a_4$, etc. of the cut-outs or recesses are additionally offset in axial direction so that the clutch disc will be actuated gradually and stepwise.

According to the embodiment illustrated in Fig. 6, the annular portion $1a$ of the pressing body is flanged in a sense opposite to that of the extension 2 of Fig. 1 so that it is adapted to receive a ring 18 of carbon, graphite, synthetic material or the like against which rests the pressure gland which is journalled in pivots on the shift fork.

In order to insert the pressing body into the spring disc, the latter is first pressed somewhat more toward the right in a manner similar to that illustrated in the upper portion of Fig. 2 until the inner tongue ends extend beyond the cylindrical extension of the pressing body in such a manner that said pressing body can now be inserted from the right. The individual tongues will then resiliently engage the cut-outs of the pressing body. In this way, the pressing body will be firmly connected or coupled to the tongues of the disc spring and will at the same time be prevented from turning in said disc spring.

Fig. 6 illustrates the disc spring 7 in pressed-in condition so that the clutch is made ineffective and the motor is de-clutched. For purposes of better supporting and holding the spring ends, the neck 9 of the pressing body generally designated 2a is increased in thickness on the pressure side, and within said cut-out portions is provided with rolling arches 10 against which the spring ends 5 rest. The wall increased in thickness may, as shown in the drawing be integral with the remaining portion of the pressing body or may be produced by providing a reinforcing ring. This arrangement prevents the spring inner ends or tongues from leaving the pressing body when the latter is pressed down too strongly. On the other hand, the insertion of the tongues is facilitated by the smaller wall thickness of the front portion of the neck of the pressing body without too great bending stresses.

It is, of course, to be understood, that the present invention is, by no means, limited to the particular constructions shown in the drawings but also comprises any modifications within the scope of the appended claims.

What I claim is:

1. In combination with a disc spring having inwardly extending tongue-like resilient members: an annular pressing body having a tubular extension provided with apertures arranged around the peripheral surface thereof and engaging the inner ends of at least some of said tongue-like resilient members, some of said apertures being confined by edges closed in themselves and some of said apertures having a passage leading to the free end of said tubular extension, said apertures being arranged so that the apertures confined by edges closed in themselves alternate with the apertures having a passage leading to the free end of said tubular extension.

2. In combination with a disc spring having inwardly extending tongue-like resilient members: an annular pressing body having a tubular extension provided with first apertures in the peripheral surface thereof which are confined by edges closed in themselves and also provided with second apertures arranged in said peripheral surface and having a passage leading to the free end of said tubular extension, said first and second apertures being distributed around the surface of said tubular extension for receiving and engaging the inner ends of said tongue-like resilient members, those edges of said first and second apertures which normally engage the inner ends of said resilient members being offset relative to each other in axial direction of said tubular extension.

3. An arrangement according to claim 2, in which every first aperture and the respective adjacent second aperture are offset relative to each other.

4. An arrangement according to claim 2, in which every two adjacent first apertures are offset with regard to each other, and in which also every two adjacent second apertures are offset relative to each other.

5. In combination with a disc spring having integral therewith inwardly extending resilient tongues with the inner ends thereof designed of substantially rectangular cross section: an annular pressing body having a tubular portion provided near one end portion thereof with passages having a cross section of closed contour and extending in radial direction through said tubular portion from the inside to the outside thereof and receiving the inner ends of at least some of said tongues, the other end of said tubular portion forming an annular radially outwardly extending flange.

6. An arrangement according to claim 5, in which said tubular portion has a cylindrical cross section.

7. An arrangement according to claim 5, in which said tubular portion has a clearly distinctive polygonal cross section.

8. In combination with a disc spring having integral therewith inwardly extending resilient tongues with the inner ends thereof designed of substantially rectangular cross section: an annular pressing body of sheet metal and composed of a tubular portion and an adjacent radially outwardly extending flanged portion connected to said tubular portion, said tubular portion having that end thereof which is remote from said flanged portion provided with radial passages of closed substantially rectangular cross section extending all the way through said tubular portion in peripherally substantially evenly spaced arrangement and receiving the innermost ends of at least some of said tongues.

9. An arrangement according to claim 8, in which said pressing body is made of hardened sheet metal.

10. In combination with a disc spring having integral therewith inwardly extending resilient tongues with the inner ends thereof designed of substantially rectangular cross section: an annular pressing body having a tubular portion provided near one end portion thereof with apertures extending through said tubular portion and receiving the inner ends of at least some of said tongues, some of said apertures being of closed contour and some of said apertures having a passage leading to the adjacent end face of said pressing body so as to be of open contour, some of the innermost ends of said tongues being located in said apertures of closed contour and the other innermost ends of said tongues being located in the apertures of open contour, the other end of said tubular portion forming an annular radially outwardly extending flange.

11. In combination with a disc spring having integral therewith inwardly extending resilient tongues with the inner ends thereof designed of substantially rectangular cross section: an annular pressing body having a tubular portion provided near one end portion thereof with apertures extending through said tubular portion and receiving the inner ends of at least some of said tongues, the other end of said tubular portion forming an annular radially outwardly extending flange, the outer peripheral portion of said radially outwardly extending flange being provided with an axially extending flange extending in the direction away from said tubular portion, and a ring member mounted within said axially extending flange for actuation by a shift fork operable pressure member.

12. In combination with a disc spring having integral therewith inwardly extending resilient tongues with the inner ends thereof designed of substantially rectangular cross section: an annular pressing body having a tubular portion provided near one end portion thereof with apertures extending through said tubular portion and receiving the inner ends of at least some of said tongues, the other end of said tubular portion forming an outwardly extending flange having a radially outwardly extending portion and an axially extending portion extending away from said tubular portion and integral with the peripheral portion of said radially extending portion.

13. In combination with a disc spring having integral therewith inwardly extending resilient tongues with the inner ends thereof designed of substantially rectangular cross section: an annular pressing body having a tubular portion provided near one end portion thereof with apertures extending through said tubular portion and receiving the inner ends of at least some of said tongues, the other end of said tubular portion forming an outwardly extending flange having a radially outwardly extending portion and an axially extending portion extending away from said tubular portion and integral with the peripheral portion of said radially extending portion, that area of said tubular portion which is located between said apertures and said radially outwardly extending portion of said flange having an increased thickness over said radially outwardly extending portion of said flange, those edge portions which form part of said apertures being rounded for engagement with the adjacent side of said disc spring tongues.

References Cited in the file of this patent

UNITED STATES PATENTS

| | | |
|---|---|---|
| 2,100,464 | Almen et al. | Nov. 30, 1937 |
| 2,356,310 | Gass | Aug. 22, 1944 |
| 2,399,886 | Odevseff | May 7, 1946 |
| 2,445,638 | Saks | July 20, 1948 |